United States Patent
Nemoto et al.

(10) Patent No.: US 7,025,342 B2
(45) Date of Patent: Apr. 11, 2006

(54) ACTUATOR DRIVE CONTROL DEVICE FOR ACTIVE VIBRATION ISOLATION SUPPORT SYSTEM, AND METHOD OF USING SAME

(75) Inventors: Hirotomi Nemoto, Saitama (JP); Atsushi Abe, Saitama (JP); Takashi Matsuura, Tochigi (JP); Kenichi Yoshimura, Tochigi (JP)

(73) Assignees: Honda Motor Co., Ltd., Tokyo (JP); Keihin Corporation, Tokyo (JP)

( * ) Notice: Subject to any disclaimer, the term of this patent is extended or adjusted under 35 U.S.C. 154(b) by 0 days.

(21) Appl. No.: 10/862,822

(22) Filed: Jun. 7, 2004

(65) Prior Publication Data
US 2005/0017420 A1    Jan. 27, 2005

(30) Foreign Application Priority Data
Jun. 13, 2003   (JP)   ............... 2003-169562

(51) Int. Cl.
  *F16F 15/00*   (2006.01)
(52) U.S. Cl. .............. 267/140.14; 267/140.15
(58) Field of Classification Search ........... 267/140.14, 267/140.15, 218; 248/636, 562
  See application file for complete search history.

(56) References Cited

U.S. PATENT DOCUMENTS

| | | | | |
|---|---|---|---|---|
| 5,020,491 A | * | 6/1991 | Mashino | 123/192.1 |
| 5,086,741 A | * | 2/1992 | Nakamura et al. | 123/406.2 |
| 5,291,967 A | * | 3/1994 | Aoki | 248/562 |
| 5,332,061 A | * | 7/1994 | Majeed et al. | 267/140.15 |
| 5,385,129 A | * | 1/1995 | Eyberg | 123/436 |
| 6,422,546 B1 | * | 7/2002 | Nemoto et al. | 267/140.14 |
| 2003/0030203 A1 | * | 2/2003 | Nemoto | 267/140.14 |

FOREIGN PATENT DOCUMENTS

JP    2003-113892    4/2003

* cited by examiner

*Primary Examiner*—Thomas Williams
(74) *Attorney, Agent, or Firm*—Carrier, Blackman & Associates, P.C.; William D. Blackman; Joseph P. Carrier

(57) ABSTRACT

In an actuator drive control device for an active vibration isolation support system, accumulated time of eight time intervals tn of crank pulses which are outputted at every 15 degrees of a crank angle in a vibration period corresponding to 120 degrees of the crank angle, and average accumulated time shown by a straight line connecting a start point and an end point of the line of the accumulated time are calculated. Eight deviations Δtn are calculated by subtracting the average accumulated time from the accumulated time. A variation waveform of the deviations Δtn corresponds to a variation waveform of the time interval tn of the crank pulses attributable only to the engine vibration with the influence of a variation in the engine rotational speed Ne being eliminated. Therefore, the vibration isolation function of an active vibration isolation support system can be effectively executed by controlling an actuator of the active vibration isolation support system based on the engine vibration which is estimated from the variation waveform of the time interval tn. Thus, the active vibration isolation support system is precisely controlled by accurately estimating a vibration state of the engine when the engine rotational speed increases and decreases.

8 Claims, 8 Drawing Sheets

ACTUATOR DRIVE CONTROL DEVICE FOR ACTIVE VIBRATION ISOLATION SUPPORT SYSTEM, AND METHOD OF USING SAME

BACKGROUND OF THE INVENTION

1. Field of the Invention

The present invention relates to an actuator drive control device for an active vibration isolation support system, in which a control apparatus controls an operation of an actuator based on a vibration state of an engine which is estimated from angular acceleration of a crankshaft, so as to suppress transmission of vibration from an engine.

2. Description of the Related Art

Such an active vibration isolation support system is known from Japanese Patent Laid-open No. 2003-113892.

This active vibration isolation support system, described in the reference, calculates a crank angular speed from a time interval of crank pulses which are outputted at each predetermined rotational angle of the crankshaft; calculates torque of the crankshaft from a crank angular acceleration obtained by differentiating the crank angular speed with respect to time; estimates the vibration state of the engine as a variation amount of torque; and controls application of electrical current to a coil of an actuator in accordance with the vibration state of the engine, to effect the vibration isolation function.

Figure 8A:
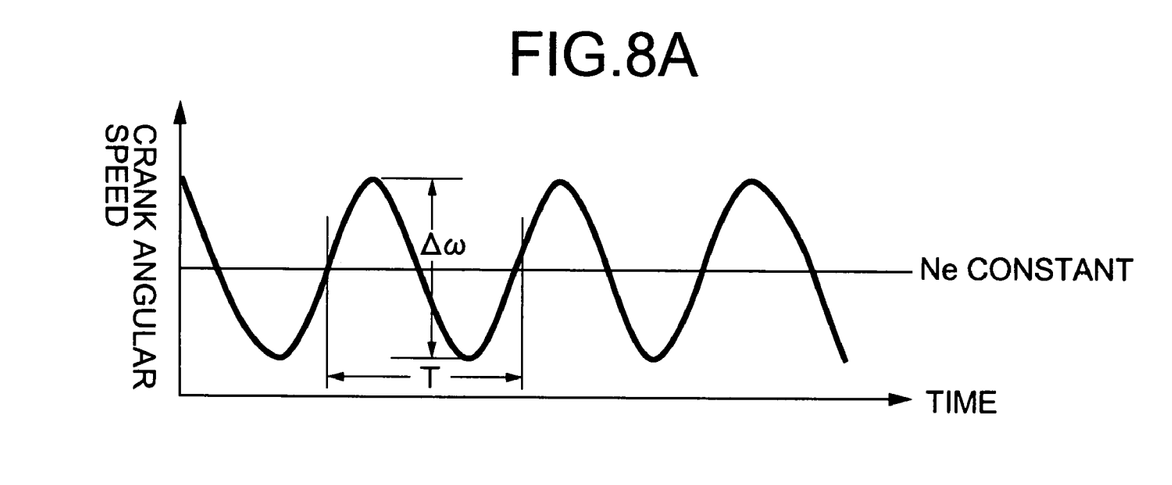
FIGS. 8A and 8B are diagrams explaining a conventional method for obtaining the crank angular acceleration.

FIG. 8A shows a variation waveform of the crank angular speed in the case where an engine rotational speed Ne is substantially constant. The variation waveform of the crank angular speed is in a sine wave shape, the angular acceleration of the crankshaft can be approximated at a value $2\omega/T$ which is obtained by dividing a variation amount $\Delta\omega$ by a half of one period T. Accordingly, based on the difference between "+$2\omega/T$" that is a positive crank angular acceleration in the one period of the variation waveform of the crank angular speed and "–$2\omega/T$" that is a negative crank angular acceleration, the torque variation of the crankshaft, namely, the vibration state of the engine can be estimated.

In the example shown in FIG. 8A, the engine rotational speed Ne is substantially constant, but when the conventional method is applied to the case where the engine rotational speed Ne increases or decreases, the following problem occurs.

Figure 8B:
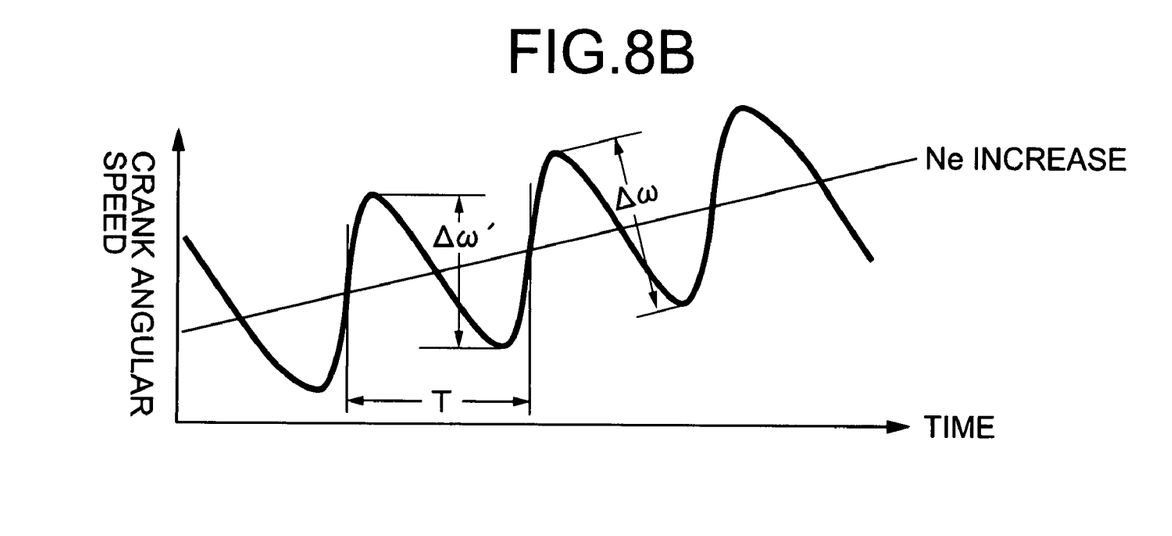

FIG. 8B shows a variation waveform of the crank angular speed in the case where the engine rotational speed Ne increases. In this case, the regular variation amount $\Delta\omega$ of the crank angular speed should be measured in the direction orthogonal to the straight line representing the engine rotational speed Ne, but actually a variation amount $\Delta\omega'$ in the direction parallel to the vertical axis is measured, so that the variation amount $\Delta\omega'$ becomes smaller than the regular variation amount $\Delta\omega$. Accordingly, an error disadvantageously occurs when the vibration state of the engine is estimated based on the variation amount $\Delta\omega'$ in the direction parallel to the vertical axis. This problem also occurs in the case where the engine rotational speed Ne decreases.

The present invention has been achieved under the above-mentioned circumstances, and has an object to accurately estimate a vibration state of an engine when an engine rotational speed increases and decreases, thereby precisely controlling an active vibration isolation support system.

SUMMARY OF THE INVENTION

In order to achieve the above-described object, according to a first feature of the present invention, there is provided an actuator drive control device for an active vibration isolation support system, comprising a control apparatus which controls an operation of an actuator based on a vibration state of an engine which is estimated from an angular acceleration of a crankshaft, so as to suppress transmission of a vibration of the engine, wherein the control apparatus corrects the angular acceleration of the crankshaft in accordance with an increasing and decreasing state of an engine rotational speed.

With the first feature, the angular acceleration of the crankshaft is corrected in accordance with the increasing and decreasing state of the engine rotational speed, thereby eliminating the influence of the variation in the angular acceleration of the crankshaft attributable to the increase and decrease in the engine rotational speed, properly estimating the engine vibration from the variation in the angular acceleration of the crankshaft attributable to only the engine vibration, and precisely controlling the actuator of the active vibration isolation support system to allow the active vibration isolation support system to effectively execute the vibration isolation function.

In addition to the first feature, according to a second feature of the present invention, there is provided an actuator drive control device for an active vibration isolation support system, in which the angular acceleration of the crankshaft is corrected by calculating a deviation of an actual angular speed with respect to an average angular speed of the crankshaft per one period of an engine vibration.

With the second feature, the angular acceleration of the crankshaft is corrected by calculating the deviation of the actual angular speed with respect to the average angular speed of the crankshaft per one period of the engine vibration. Therefore, the influence of the variation in the angular speed of the crankshaft attributable to the increase and decrease of the engine rotational speed is properly eliminated, thus precisely estimating the actual vibration state of the engine.

The electronic control unit U in the embodiment corresponds to the control apparatus of the present invention.

DESCRIPTION OF THE PREFERRED EMBODIMENT

One exemplary illustrative embodiment of the present invention will be described with reference to the accompanying drawings.

An active vibration isolation support system M shown in FIG. 1 to FIG. 4 elastically supports an engine E (V-type four-cycle six-cylinder engine in this embodiment) of an automobile in a vehicle body frame F. The system is controlled by an electronic control unit U to which a crank pulse sensor Sa is connected for detecting crank pulses that are outputted accompanying rotation of a crankshaft of the engine E. Twenty-four crank pulses are outputted per rotation of the crankshaft, that is, one crank pulse is outputted for every 15 degrees of crank angle.

Figure 1:
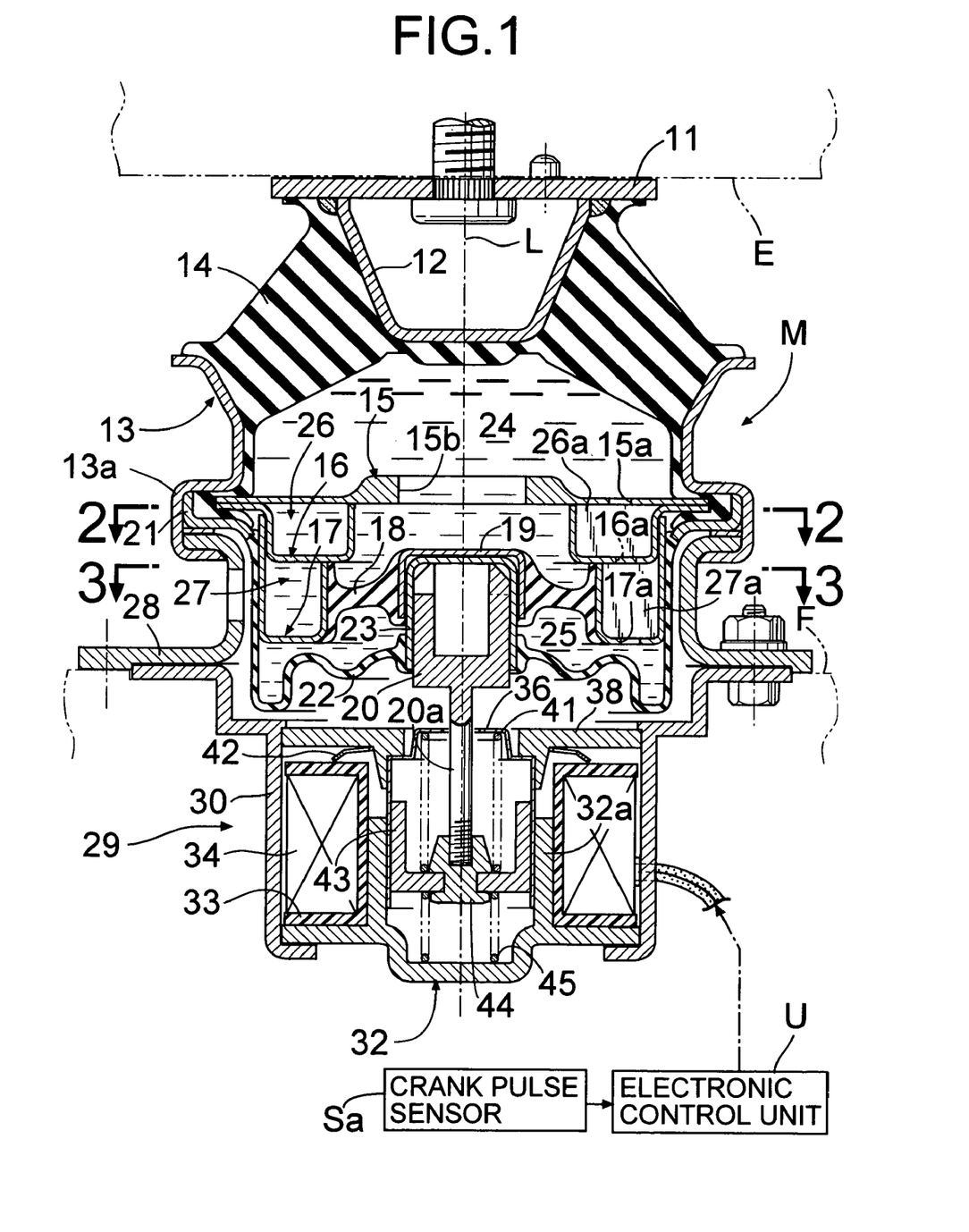
FIG. 1 is a vertical sectional view of an active vibration isolation support system according to an illustrative embodiment of the present invention.
Figure 2:
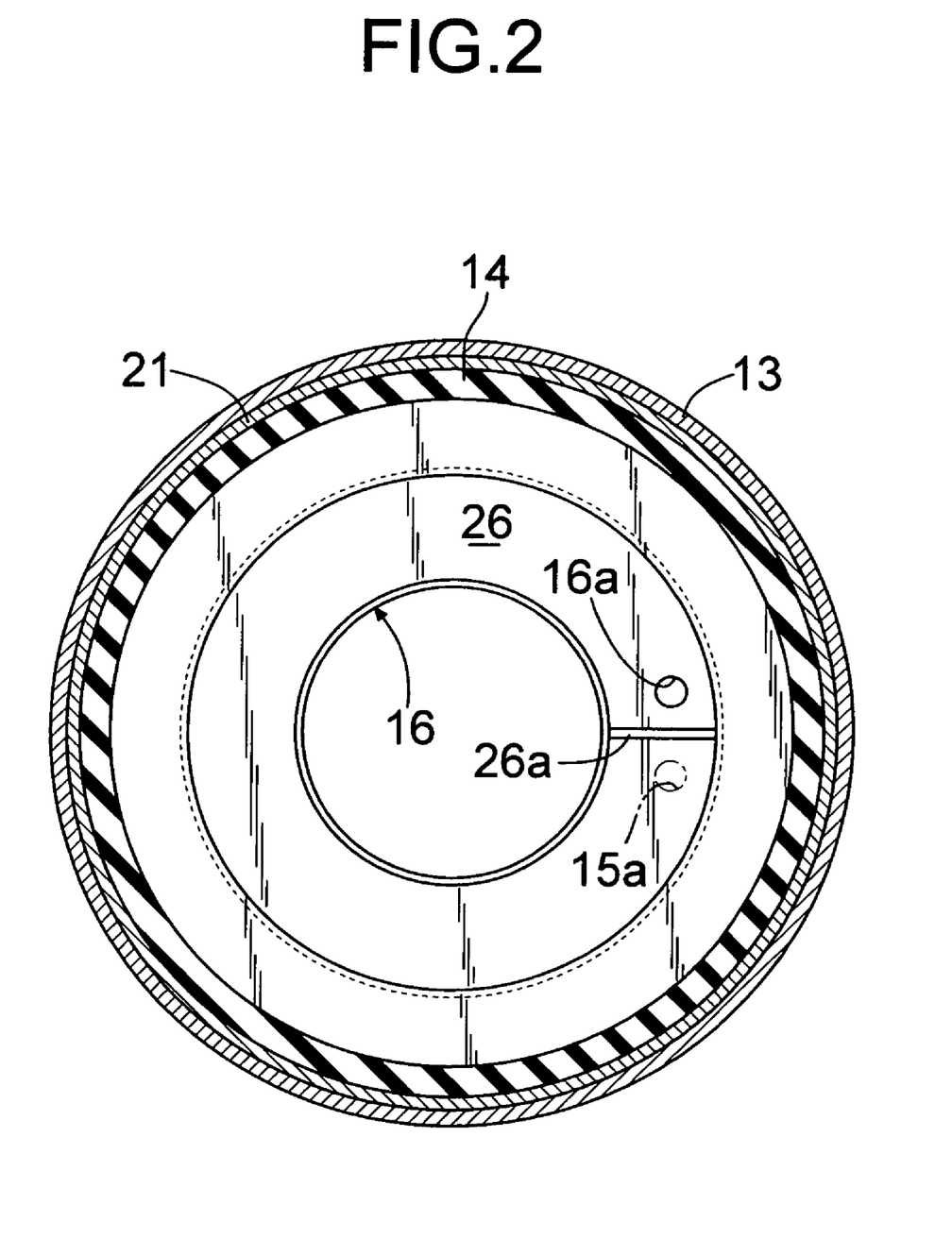
FIG. 2 is a sectional view taken along the line 2—2 in FIG. 1.
Figure 3:
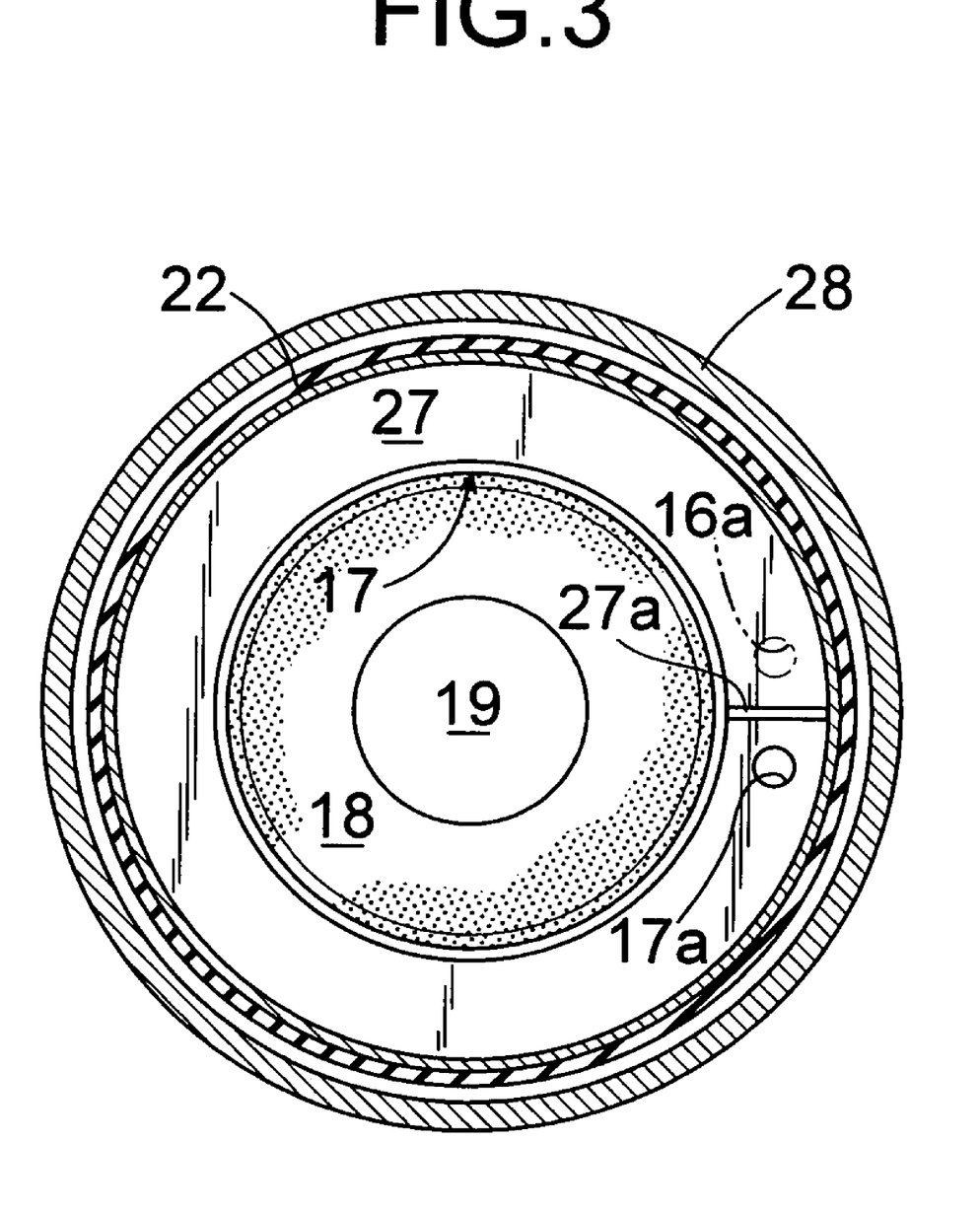
FIG. 3 is a sectional view taken along the line 3—3 in FIG. 1.

The active vibration isolation support system M has a structure that is substantially symmetrical with respect to an axis L. The system M includes an inner tube 12 that is welded to a plate-shaped mounting bracket 11 that is joined to the engine E, and an outer tube 13 that is placed coaxially on an outer periphery of the inner tube 12. The inner tube 12 and the outer tube 13 are bonded by vulcanization bonding to an upper end and a lower end, respectively, of a first elastic body 14 made of thick rubber. A disc-shaped first orifice-forming member 15 having an aperture 15b in its center, an annular second orifice-forming member 16 having a dipper-shaped section open at the top, and an annular third orifice-forming member 17 similarly having a dipper-shaped section open at the top are welded together into a single unit. The outer peripheries of the first orifice-forming member 15 and the second orifice-forming member 16 are superimposed and fixed to a crimping fixing part 13a provided in a lower part of the outer tube 13.

The outer periphery of a second elastic body 18 made of a rubber membrane is fixed by vulcanization bonding to the inner periphery of the third orifice-forming member 17. An outer cap member 19, fixed by vulcanization bonding to the inner periphery of the second elastic body 18, is fixed by press fitting onto a movable member 20 disposed on the axis L to be vertically movable. The outer periphery of a diaphragm 22 is fixed by vulcanization bonding to a ring member 21 that is fixed to the crimping fixing part 13a of the outer tube 13. An inner cap member 23, fixed by vulcanization bonding to the inner periphery of the diaphragm 22, is fixed onto the movable member 20 by press fitting. The inner cap member 23 fits closely inside the outer cap member 19.

A first liquid chamber 24, which is charged with a liquid, is thus defined between the first elastic body 14 and the second elastic body 18, and a second liquid chamber 25, which is charged with a liquid, is thus defined between the second elastic body 18 and the diaphragm 22. The first liquid chamber 24 and the second liquid chamber 25 communicates with each other via an upper orifice 26 and a lower orifice 27 which are formed by the first to third orifice-forming members 15, 16 and 17.

The upper orifice 26 is an annular passage formed between the first orifice-forming member 15 and the second orifice-forming member 16. A communicating hole 15a is formed in the first orifice-forming member 15 on one side of a partition wall 26a provided in a part of the upper orifice 26, and a communicating hole 16a is formed in the second orifice-forming member 16 on the other side of the partition wall 26a. Therefore, the upper orifice 26 is formed over substantially one round from the communicating hole 15a of the first orifice-forming member 15 to the communicating hole 16a of the second orifice-forming member 16 (see FIG. 2).

A lower orifice 27 is an annular passage formed between the second orifice-forming member 16 and the third orifice-forming member 17. The communicating hole 16a is formed in the second orifice-forming member 16 on one side of a partition wall 27a provided in a part of the lower orifice 27, and a communicating hole 17a is formed in the third orifice-forming member 17 on the other side of the partition wall 27a. Therefore, the lower orifice 27 is formed over substantially one round from the communicating hole 16a of the second orifice-forming member 16 to the communicating hole 17a of the third orifice-forming member 17 (see FIG. 3).

As a result of the above description, the first liquid chamber 24 and the second liquid chamber 25 communicate with each other via the upper orifice 26 and the lower orifice 27 which are connected to each other in series.

An annular mounting bracket 28 for fixing the active vibration isolation support system M to the vehicle body frame F is fixed to the crimping fixing part 13a of the outer tube 13, and an actuator housing 30 constructing an outer shell of an actuator 29 for driving the movable member 20 is welded to a lower surface of the mounting bracket 28.

Figure 4:
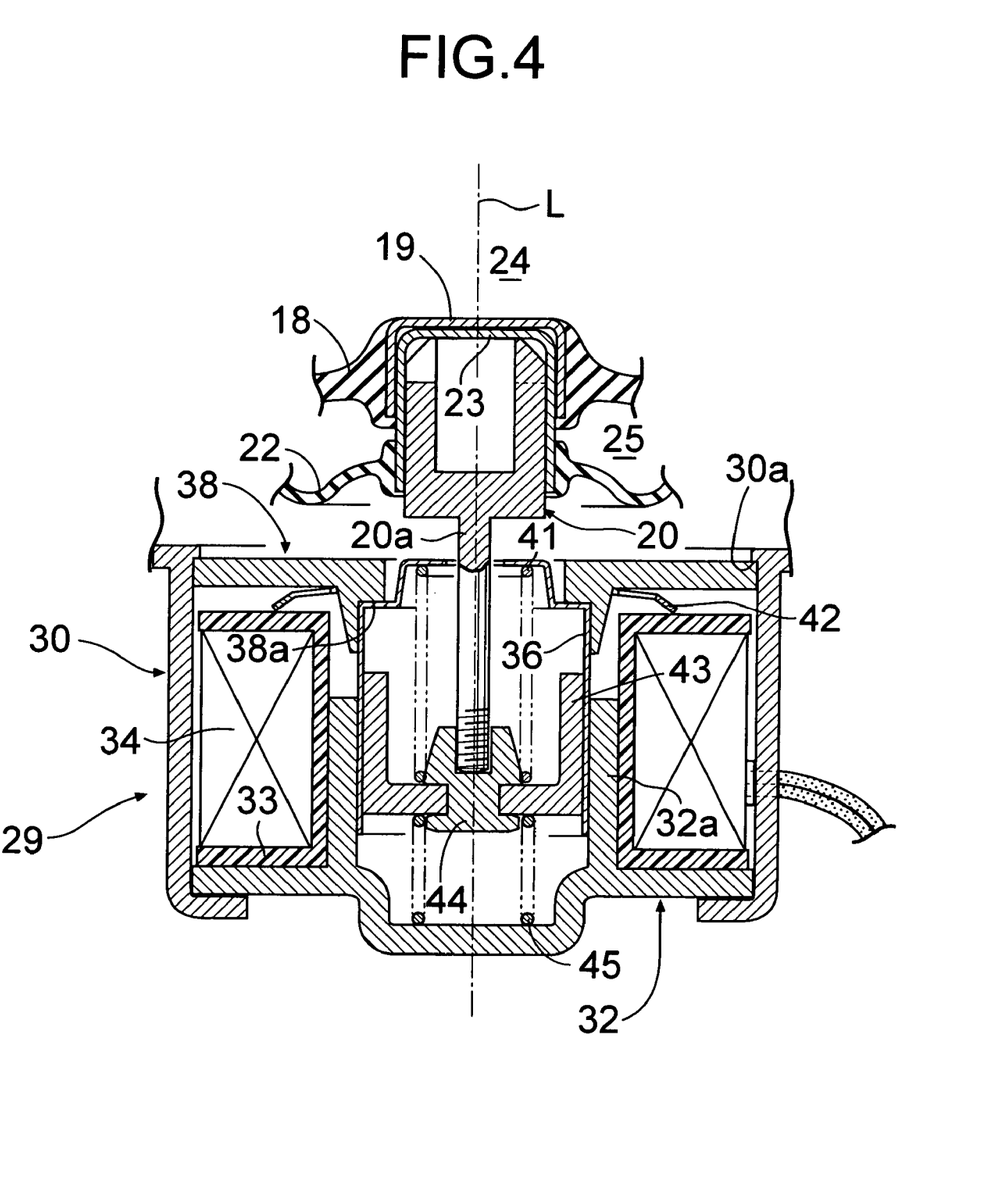
FIG. 4 is an enlarged view of an essential part of FIG. 1.

A yoke 32 is fixed to the actuator housing 30, and a coil 34, wound around a bobbin 33, is housed in a space surrounded by the actuator housing 30 and the yoke 32. A bottomed cylindrical bearing 36 is fitted in a tubular part 32a of the yoke 32 fitted in an inner periphery of the annular coil 34. A disc-shaped armature 38 facing an upper surface of the coil 34 is slidably supported on an inner peripheral surface of the actuator housing 30. A step part 38a formed on an inner periphery of the armature 38 engages with an upper part of the bearing 36. The armature 38 is biased upward by a disc spring 42 that is disposed between the armature 38 and an upper surface of the bobbin 33, and is positioned by engagement with a retaining part 30a provided on the actuator housing 30.

A cylindrical slider 43 is slidably fitted in the inner periphery of the bearing 36, and a shaft part 20a extending downward from the movable member 20 loosely penetrates through an upper base part of the bearing 36 to be connected to a boss 44 that is fixed to an interior of the slider 43. A coil spring 41 is disposed between the upper base part of the bearing 36 and the slider 41. The bearing 36 is biased upward by this coil spring 41, and the slider 43 is biased downward by the coil spring 41.

When the coil 34 of the actuator 29 is in a demagnetized state, an elastic force of the coil spring 41 acts downward on the slider 43 slidably supported in the bearing 36, and an elastic force of a coil spring 45 disposed between the slider 43 and a base surface of the yoke 32 acts upward, so that the slider 43 stops at a position where the elastic forces of both the coil springs 41 and 45 are in balance. When the coil 34 is excited in this state so as to draw the armature 38 downward, the step part 38a pushes the bearing 36 to slide it downward, thereby compressing the coil spring 41. As a result, the elastic force of the coil spring 41 increases, thereby lowering the slider 43 while compressing the coil spring 45, the movable member 20 that is connected to the slider 43 via the boss 44 and the shaft part 20a descends, and the second elastic body 18 connected to the movable member 20 deforms downward, thus increasing the capacity of the first liquid chamber 24. Conversely, when the coil 34 is demagnetized, the movable member 20 rises, the second elastic body 18 deforms upward, and the capacity of the first liquid chamber 24 decreases.

When a low-frequency engine-shake vibration occurs while the automobile is traveling, if a load inputted from the engine E deforms the first elastic body 14, thus changing the capacity of the first liquid chamber 24, the liquid travels between the first liquid chamber 24 and the second liquid chamber 25, which are connected via the upper orifice 26 and the lower orifice 27. When the capacity of the first liquid chamber 24 increases and decreases, the capacity of the second liquid chamber 25 decreases and increases accordingly, and this change in the capacity of the second liquid chamber 25 is absorbed by the elastic deformation of the diaphragm 22. Since the shapes and dimensions of the upper orifice 26 and the lower orifice 27 and the spring constant of the first elastic body 14 are set so that a high spring constant and a high attenuation force can be obtained in a region of the frequency of engine shake vibration, the vibration that is transmitted from the engine E to the vehicle body frame F can be reduced effectively.

In this frequency region of the engine shake vibration, the actuator 29 is maintained in a non-operational state.

If vibration having a frequency higher than that of the engine shake vibration, namely, idling vibration or muffled sound vibration due to the rotation a crankshaft of the engine E occurs, the liquid within the upper orifice 26 and the lower orifice 27 which connect the first liquid chamber 24 and the second liquid chamber 25 is brought into a stick state and cannot exhibit the vibration isolation function, and therefore the actuator 29 is operated so as to exhibit the vibration isolation function.

Figure 5:
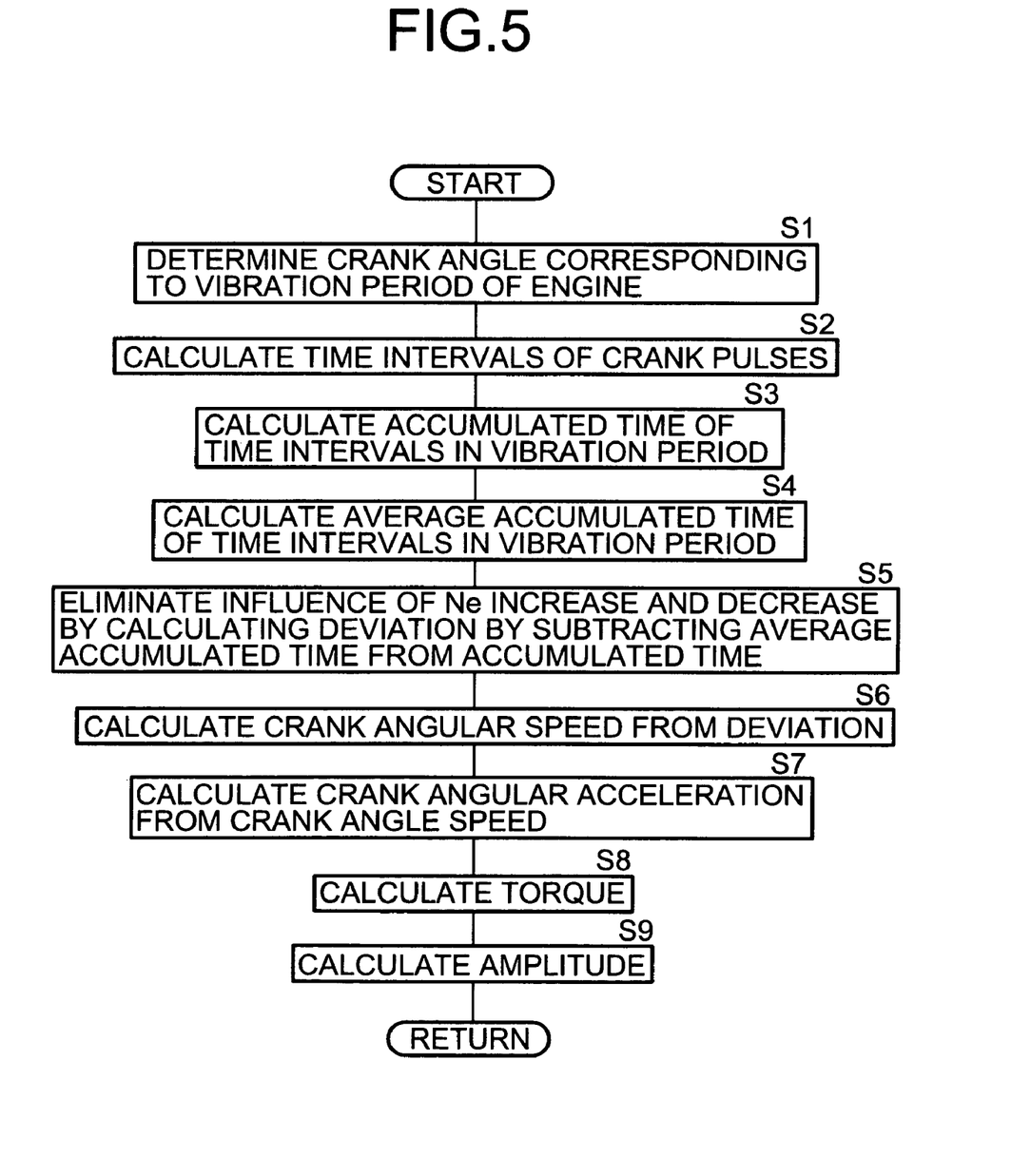
FIG. 5 is a flow chart explaining an operation of an embodiment.
Figure 6:
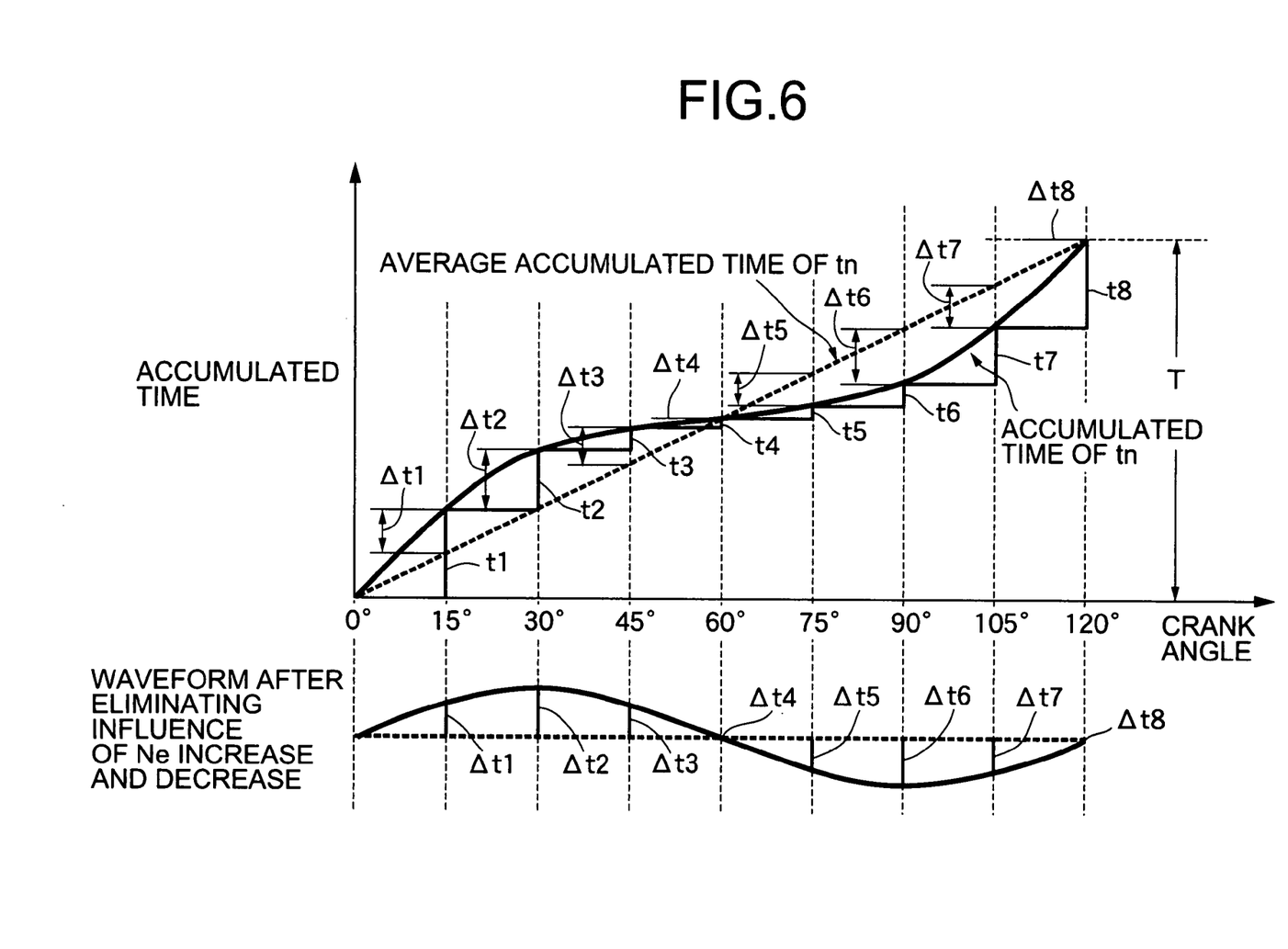
FIG. 6 is a diagram explaining step S5 of the flow chart in FIG. 5.

Next, the details of the control of the actuator 29 of the active vibration isolation support system M will be described with reference to the flow chart in FIG. 5 and the time chart in FIG. 6.

First, in step S1, a crank angle of a vibration period of an engine E is determined. In the four-cycle six-cylinder engine E in the embodiment, six explosions occur while the crankshaft makes two rotations, and therefore the crank angle of the vibration period is 120 degrees. In this vibration period, eight crank pulses are outputted at every 15 degrees of the crank angle. When the cylinders on one side of the V-type engine E of this embodiment are inactivated, three explosions occur while the crankshaft makes two rotations, and therefore the crank angle of this vibration period is 240 degrees, during which period, 16 crank pulses are outputted.

Figure 7:
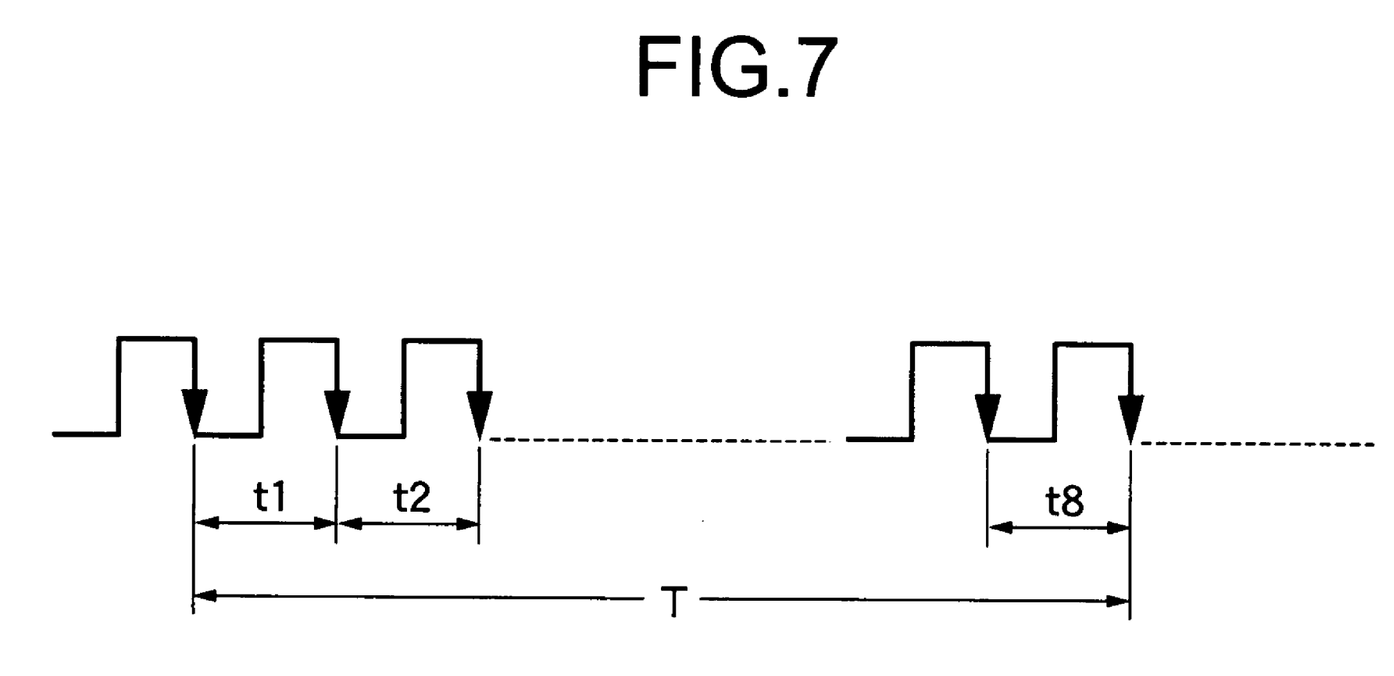
FIG. 7 is a diagram explaining the relationship between the time interval of the crank pulses and the vibration period.

In the subsequent step S2, eight crank pulses in a vibration period T are read, and the time intervals of the crank pulses are calculated. As shown in FIG. 7, eight crank pulses are outputted during the vibration period T, and the time intervals tn (t1, t2, t3 ... t8) vary according to the variation in the angular speed of the crankshaft.

Namely, in the explosion stroke of the engine E, the crank angular speed ω increases and the time interval tn becomes short, in the compression stroke of the engine E, the crank angular speed ω decreases and the time interval tn becomes long, but in the other strokes in which the engine rotational speed Ne increases, the time interval tn becomes short due to an increase in the crank angular speed ω, and in the other strokes in which the engine rotational speed Ne decrease, the time interval tn becomes long due to a decrease in the crank angular speed ω. Accordingly, the time interval tn of the crank pulses as shown in FIG. 6 includes a factor attributable to a variation in the crank angular speed ω accompanying the vibration in each vibration period T of the engine E, and a factor attributable to a variation in the crank angular speed ω accompanying an increase and decrease of the engine rotational speed Ne.

Among the above-described two factors, it is the former factor (variation in the crank angular speed ω accompanying the vibration) that has an influence on the control of the active vibration isolation support system M, and thus it is necessary to eliminate the latter factor (variation in the crank angular speed ω accompanying the increase and decrease of the engine rotational speed Ne) which does not have an influence on the control of the active vibration isolation support system M.

Accumulated time $\Sigma tn=t1+t2+t3+\ldots+t8$ of eight time intervals tn of the crank pulses is calculated in the subsequent step S3. The accumulated time $\Sigma tn$ corresponds to the vibration period T.

In the subsequent step S4, the average accumulated time of the eight time intervals tn is calculated. As is obvious from FIG. 6, the line of the accumulated time is curved in the shape of S, but the line of the average accumulated time is the straight line connecting the starting point and the end point of the line of the accumulated time. Namely, the average accumulated time corresponds to the accumulated time in the case where the crank angular speed ω is constant, and the value of the average accumulated time increases by T/8 each time the crank angle increases by 15 degrees.

In the subsequent step S5, eight deviations $\Delta t1$, $\Delta t2$, $\Delta t3$, ..., $\Delta t8$ are calculated by subtracting the average accumulated time from the accumulated time at each position at every 15 degrees of the crank angle. The line curved in the shape of S at the lower side in FIG. 6 represents a deviation $\Delta tn$, and this line corresponds to a variation waveform of the time interval tn of the crank pulses from which the influence of the variation in the engine rotational speed Ne is eliminated, namely, the deviation with respect to the time interval tn of the crank pulses in the case where the crank angular speed ω is constant.

When it is assumed that the engine vibration does not exist, if the engine speed Ne is constant, the accumulated time of the time interval tn increases linearly as in the case of the average accumulated time, but when the engine rotational speed Ne increases and decreases, the accumulated time of the time interval tn deviates from the linear average accumulated time. However, in this embodiment, by using the linear average accumulated time obtained by averaging the engine rotational speed Ne, which actually varies, as the reference, the deviation $\Delta tn$ from the average accumulated time is calculated, whereby the influence of the variation in the engine rotational speed Ne is eliminated, thus obtaining the deviation $\Delta tn$ attributable to only the vibration of the engine E. This is nothing but obtaining the deviation of the actual angular speed with respect to the average angular speed of the crankshaft.

In the subsequent step S6, the crank angular speed ω at every 15 degrees of the crank angle is calculated based on the deviation $\Delta tn$. Namely, if the crank angular speed ω is a constant value, each of the crank angular speeds ω is the result of dividing the crank angle of 15 degrees by ⅛ of the vibration period T, but actually the crank angular speed ω is given by $$15°÷(T/8+\Delta tn)$$

due to the existence of the deviation $\Delta tn$.

In the subsequent step S7, the crank angular acceleration dω/dt is calculated by differentiating the crank angular speed ω with respect to time, and further in step S8, the torque Tq around the crankshaft of the engine E is calculated by $$Tq=I\times d\omega/dt$$

where I denotes the moment of inertia around the crankshaft of the engine E. In step S9, the maximum torque value and the minimum torque value that are adjacent in time are determined, and the vibration state (amplitude) of the engine E is calculated as a difference between the maximum value and the minimum value of the torque, namely, the amount of change in torque.

The vibration state of the engine E thus calculated is highly precise because the influence of increase and decrease of the engine rotational speed Ne is eliminated. Therefore, the actuator 29 of the active vibration isolation support system M is precisely controlled, thus enhancing the vibration isolation function.

The embodiment of the present invention has been described in detail above, but the present invention can be modified in design in a variety of ways without departing from the subject matter of the invention.

For example, the active vibration isolation support system M is not limited to the one charged with a liquid, but may be the one using a piezo element.

In the embodiment, the active vibration isolation support system M for supporting the engine E of an automobile is shown as an example, but the active vibration isolation support system M of the present invention is applicable to support for any engine not for an automobile.

What is claimed is:

1. An actuator drive control device for an active vibration isolation support system, comprising a control apparatus which controls an operation of an actuator based on a vibration state of an engine which is estimated from an angular acceleration of a crankshaft, so as to suppress transmission of a vibration of the engine, wherein the control apparatus corrects the detected angular acceleration of the crankshaft in accordance with an increasing and decreasing state of an engine rotational speed, wherein a corrected angular acceleration is calculated by subtracting a detected angular speed from an average angular speed and differentiating the result with respect to time.

2. The actuator drive control device for the active vibration isolation support system according to claim 1, wherein the detected angular acceleration of the crankshaft is corrected by calculating a deviation of an actual angular speed with respect to an average angular speed of the crankshaft per one period of an engine vibration.

3. The actuator drive control device for the active vibration isolation support system according to claim 1, wherein the detected angular acceleration of the crankshaft is corrected by calculating a deviation of an actual angular speed with respect to an average angular speed of the crankshaft per one period of an engine vibration, and the torque on the crankshaft is calculated based on the corrected angular acceleration.

4. A method of operating a control apparatus to cause movement of an actuator in a motor mount based on a vibration state of an engine, to thereby suppress transmission of engine vibration, said method comprising the steps of:

estimating an angular acceleration of a crankshaft based on sensor input; and controlling movement of said actuator with said control apparatus to suppress transmission of said engine vibration, by correcting the estimated angular acceleration of said crankshaft in accordance with an increasing or decreasing rotational speed of the engine, wherein a corrected angular acceleration is calculated by subtracting an estimated angular speed from an average angular speed and differentiating the result with respect to time.

5. The method of claim 4, wherein the actuator moves a diaphragm in communication with a fluid-filled chamber of the motor mount.

6. The method of claim 4, wherein the actuator comprises an electric coil, and wherein movement of said actuator is controlled by alternately energizing and de-energizing said coil.

7. The method of claim 4, wherein the angular acceleration of the crankshaft is corrected by calculating a deviation of an actual angular speed in relation to an average angular speed of the crankshaft per one period of an engine vibration.

8. The method of claim 4, wherein the angular acceleration of the crankshaft is corrected by calculating a deviation of an actual angular speed in relation to an average angular speed of the crankshaft per one period of an engine vibration, and the torque on the crankshaft is calculated based on the corrected angular acceleration.

* * * * *